(12) United States Patent
Mou

(10) Patent No.: US 8,510,310 B2
(45) Date of Patent: Aug. 13, 2013

(54) METHOD AND SYSTEM FOR MULTI-DIMENSIONAL AND GEOGRAPHIC SEARCH

(76) Inventor: Zhijing George Mou, Bellevue, WA (US)

( * ) Notice: Subject to any disclaimer, the term of this patent is extended or adjusted under 35 U.S.C. 154(b) by 211 days.

(21) Appl. No.: 12/643,757

(22) Filed: Dec. 21, 2009

(65) Prior Publication Data

US 2010/0174721 A1    Jul. 8, 2010

Related U.S. Application Data

(60) Provisional application No. 61/140,553, filed on Dec. 23, 2008.

(51) Int. Cl.
*G06F 7/00* (2006.01)

(52) U.S. Cl.
USPC .......................................... 707/741

(58) Field of Classification Search
USPC ........................... 707/743, 724, 741, 999.003
See application file for complete search history.

(56) References Cited

U.S. PATENT DOCUMENTS

| 5,953,722 | A   | * | 9/1999  | Lampert et al. ........................ 1/1 |
| 6,470,287 | B1  | * | 10/2002 | Smartt ........................... 702/102 |
| 6,687,688 | B1  | * | 2/2004  | Fujihara et al. ......................... 1/1 |
| 7,197,500 | B1  | * | 3/2007  | Israni et al. .................... 707/809 |
| 7,305,417 | B2  | * | 12/2007 | Gray ...................................... 1/1 |
| 2002/0188581 | A1 |   | 12/2002 | Fortin et al. |
| 2003/0144795 | A1 |   | 7/2003  | Lin |
| 2004/0148277 | A1 | * | 7/2004  | Gray ................................. 707/3 |
| 2004/0205517 | A1 |   | 10/2004 | Lampert et al. |
| 2008/0010262 | A1 | * | 1/2008  | Frank ................................ 707/3 |

* cited by examiner

*Primary Examiner* — Mohammed R Uddin
(74) *Attorney, Agent, or Firm* — Olympic Patent Works PLLC

(57) ABSTRACT

One embodiment of the present invention is directed to a multi-dimensional and geographic-search system that includes a search-region-receiving component that receives coordinates that define a region to be searched, an indexing component that generates an index for each of the received coordinates, a recursive-decomposition component that decomposes the region into sub-regions based on the indices generated by the indexing component, and a search component that selects points of interest from a points-of-interest database by comparing indices computed for the sub-regions to indices computed and stored in the database for each point of interest. Additional embodiments are directed to carrying out efficient, index-based searching for various additional types index-characterized entities.

15 Claims, 6 Drawing Sheets

|  | j | 0 | 1 | 2 | 3 | 4 | 5 | 6 | 7 |
|---|---|---|---|---|---|---|---|---|---|
| i |  |  |  |  |  |  |  |  |  |
| 0 |  | 0 | 1 | 4 | 5 | 16 | 17 | 20 | 21 |
| 1 |  | 2 | 3 | 6 | 7 | 18 | 19 | 22 | 23 |
| 2 |  | 8 | 9 | 12 | 13 | 24 | 25 | 28 | 29 |
| 3 |  | 10 | 11 | 14 | 15 | 26 | 27 | 30 | 31 |
| 4 |  | 32 | 33 | 36 | 37 | 48 | 49 | 52 | 53 |
| 5 |  | 34 | 35 | 38 | 39 | 50 | 51 | 54 | 55 |
| 6 |  | 40 | 41 | 44 | 45 | 56 | 57 | 60 | 61 |
| 7 |  | 42 | 43 | 46 | 47 | 58 | 59 | 62 | 63 |

METHOD AND SYSTEM FOR MULTI-DIMENSIONAL AND GEOGRAPHIC SEARCH

CROSS-REFERENCE TO RELATED APPLICATION

This application claims the benefit of provisional patent application Ser. No. 61/140,553 filed Dec. 23, 2008 by the present inventor.

TECHNICAL FIELD

The present invention is directed to methods and systems for efficient search of points of interest in multi-dimensional and geographic space.

BACKGROUND OF THE INVENTION

With the advance of information technology in recent years, the problem of searching and retrieval of data records has been encountered in many different application areas. While the technology of string-based search has matured over the years, the search of multi-dimensional space remains an area of active research. In particular, web-based maps and mobile maps in cell phones have been popularized in recent years. These mapping technologies call for efficient systems to support geographic search of points of interest over geographic space. Multi-dimensional search also has applications in domains such as similarity search of database records, pattern recognition, near neighbor search, and matching problems.

SUMMARY OF THE INVENTION

One embodiment of the present invention is directed to a multi-dimensional and geographic-search system that includes a search-region-receiving component that receives coordinates that define a region to be searched, an indexing component that generates an index for each of the received coordinates, a recursive-decomposition component that decomposes the region into sub-regions based on the indices generated by the indexing component, and a search component that selects points of interest from a points-of-interest database by comparing indices computed for the sub-regions to indices computed and stored in the database for each point of interest. Additional embodiments are directed to carrying out efficient, index-based searching for various additional types index-characterized entities.

BRIEF DESCRIPTION OF THE DRAWINGS

FIG. 3 illustrates how the points in a 2-dimensional space are indexed with the mapping F, according to one embodiment of the present invention.

DETAILED DESCRIPTION OF THE INVENTION

The Bit Permutation Mapping

Certain embodiments of the present invention employ a bit-shuffle mapping from high dimensional space to one dimensional space and recursively decompose the region into smaller sub-regions with identifiable precisions. A search query to the given region is thus reduced to multiple searches over the linearly ordered keys derived from the mapping in the database, which is indexed.

It should be noted that method embodiments of the present invention are computational methods, encoded as computer instructions, that are necessarily carried out on an electronic computer system, or on other electronic-processor-containing devices. These methods involve far too many computations than can be feasibly undertaken by mental or hand calculation. For even simple cases, many thousands of basic arithmetic operations need to be carried out, and their results combined and processed. Hand calculation could take days or months, and would be extremely error-prone, while the problem domains in which embodiments of the present invention are applied involve real-time searching applications that are expected to produce results in seconds or fractions of seconds.

The space considered is a multi-dimensional space S, alternatively referred to as "d-dimensional," where d is small integer greater than 1. Each point in the space has integer coordinates of the form $(x_{d-1}, \ldots, x_0)$, where $0 \leq x_i \leq (n_i-1)$ for $0 \leq i \leq (d-1)$. The shape of the space is given by the vector $(n_{d-1}, \ldots, n_0)$, the size of the space is given by the product $$\prod_{i=0}^{d-1} n_i.$$

At first, a mapping from the d-dimensional space to one dimensional space is given as in Method 1 below. Note that Method 1 uses an operations Set(x, p, b), which sets the p-th least significant bit of integer x to the binary value b, and an operation Get(x, p), which returns the p-th least significant bit of integer x.

---

Method 1: $F(x_{d-1}, \ldots, x_0)$. Bit permutation mapping of a point $x=(x_{d-1}, \ldots, x_0)$ with integer coordinates in d-dimensional space to a point in a one-dimensional space.

--- let
 $B(x_i) = (b_{n-1}{}^i, \ldots, b_0{}^i)$ the binary form of $x_i$, for i=0 to (d−1);
 y an integer of d × n bits
in
 for i =0 to (n−1)
  for j=0 to (d−1)
   Set (y, i × d + j , Get($x_j$,i))

-continued

```
Method 1: F(x_{d-1},...,x_0). Bit permutation mapping of a point
x=(x_{d-1},...,x_0) with integer coordinates in d-dimensional
space to a point in a one-dimensional space.

end
   end
   return y
```

Given a point $x=(x_{d-1}, \ldots, x_0)$ in a d-dimensional space, the value $y=F(x)$ will be referred to as the index of the point.

Figure 1:
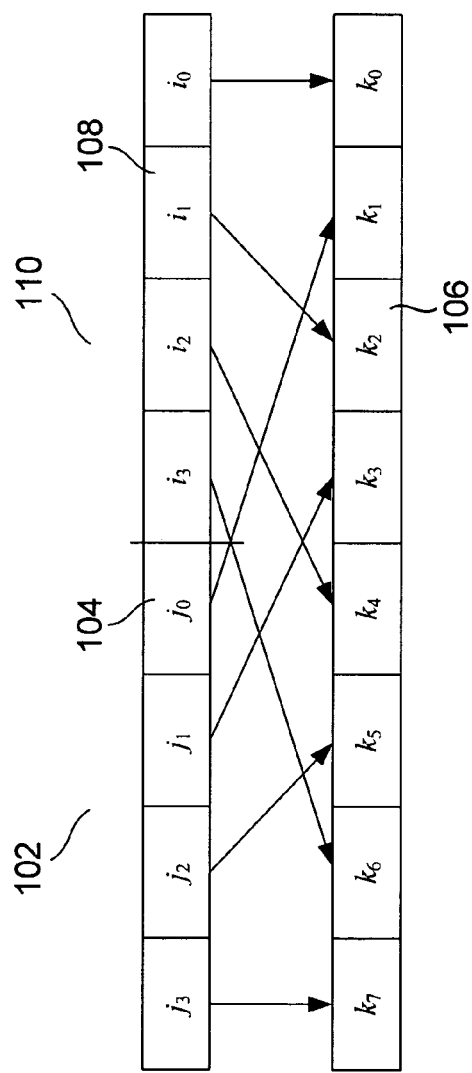
FIG. 1 illustrates a bit-permutation mapping F of points from a two-dimensional space to one-dimensional indices, according to one embodiment of the present invention.

An illustration of the method for dimensionality of two is given in FIG. 1. In FIG. 1, a point with coordinates (j, i) is mapped to an index k by permuting the binary bits of j and i to obtain the bits of k. In particular, in FIG. 1, the coordinate j is represented by an ordered set of 4 bits $(j_3, j_2, j_1, j_0)$ 102, where $j_0$ 104 is the least significant bit. For example, $k_2$ 106, the second least significant bit of k, is obtained from the second least significant bit $i_1$ 108 of the ordered set of 4 bits $(i_3, i_2, i_1, i_0)$ 110 that represent the i coordinate.

The bit permutation mapping F is one-one and onto, and therefore reversible. The reverse mapping of F is denoted by $F^{-1}$, and can be thought as distributing the bits from the index of a point to the binary forms of the coordinates of the point in d-dimensional space from least-significant-to-most-significant order. The method for $F^{-1}$ is given below:

```
Method 2. F^{-1} (y) for d-dimensional space let
   B(y) = (b_{n-1},...,b_0)
   w = n/d
   x_i integer of w bits, for i = 0 to (d-1)
in
   for p=0 to w
      for i = 0 to (d-1)
         Set (x_i,p,Get(y,p × w + i))
      end
   end
   return (x_{d-1},...,x_0).
```

Figure 2:
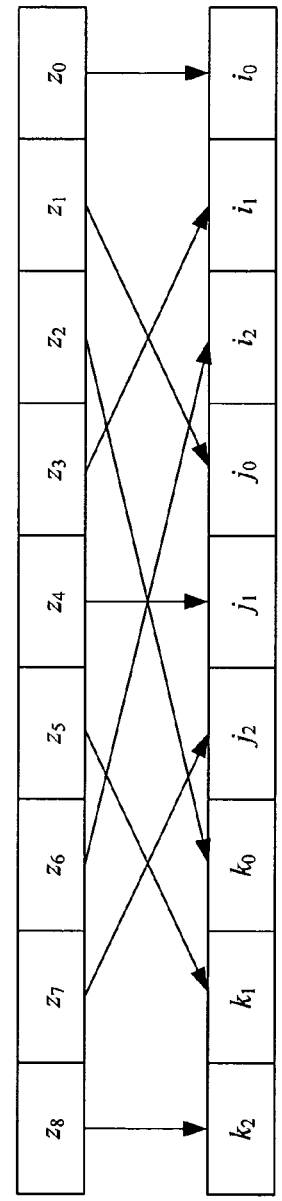
FIG. 2 illustrates a function $F^{-1}$, the inverse of a bit-permutation mapping for a three-dimensional space, according to one embodiment of the present invention.

The inverse mapping $F^{-1}$ is illustrated in FIG. 2 for space dimensionality of three, using similar illustration conventions as used in FIG. 1. FIG. 3 illustrates the one-one correspondences, defined by the mappings of F and $F^{-1}$, between points in a two-dimensional space with indices i and j that range in value from 0 to 7, and that can each therefore be represented by 3-bits, and their corresponding indices in an index k that ranges from 0 to 63, and that therefore can be represented by 6 bits. In FIG. 3, the values of index k are shown in a two-dimensional table indexed by the values of i and j.

Regions

A linear region defined by two indices $k_1$ and $k_2$, where $k_1 \leq k_2$, denoted by $R=[k_1, k_2]$, is the set of indices $[k_1, k_2]=\{k|k_1 \leq k \leq k_2\}$. The size of a linear region R, denoted S(R), is given by $k_2-k_1+1$. On the other hand, given two indices $k_1$ and $k_2$, where $k_1 \leq k_2$, $F^{-1}(k_1)=)x_{d-1}^1, \ldots, x_0^1)$, and $F^{-1}(k_2)=(x_{d-1}^2, \ldots, x_0^2)$, then a regular region of a d-dimensional space, where d>1, defined by the two indices $k_1$ and $k_2$, denoted "$R=\langle k_1, k_2 \rangle$," is the set of indices given by:

$$\langle k_1, k_2 \rangle = \{F(x_{k-1}, \ldots, x_0) | \min(x_{k-1}^1, x_{k-1}^2) \leq x_{k-1} \leq \max(x_{k-1}^1, x_{k-1}^2), \ldots, \min(x_0^1, x_0^2) \leq x_0 \leq \max(x_0^1, x_0^2)\}$$

For instance, a regular region in an indexed two-dimensional space has a rectangular form. The size of a regular region R, also denoted "S(R)," is given by the product of the sizes along each of the dimensions, i.e. $S(R)=(x_{d-1}^2-x_{d-1}^1+1) \times \ldots \times (x_0^2-x_0^1+1)$. For example, when d=2, [3, 15]={3, 4, 5, ..., 15}, and $\langle 3, 15 \rangle = \{3, 6, 7, 9, 11, 12, 13, 14, 15\}$. S([3, 15])=13, S($\langle 3, 15 \rangle$)=9. It can be seen that a regular region is always a subset of the corresponding linear region when defined by the same two indices. In other words, given two indices $k_1$ and $k_2$, where $k_1 \leq k_2$, the following always holds:

$$\langle k_1, k_2 \rangle \subseteq [k_1, k_2]$$

This leads to an important notion called perfect regions. A regular region in a d-dimensional space is perfect if and only the following holds:

$$\langle k_1, k_2 \rangle = [k_1, k_2]$$

In other words, a region is perfect if and only if its regular region and linear region are identical. A regular region is said to be a cube if its size along each of the dimensions are identical. A cube is said to be perfect if the region defined by the cube is perfect. A perfect cubical region in a two-dimensional space is also referred to as a perfect square. As an example, $[0, 15]=\langle 0, 15 \rangle = \{0, 1, \ldots, 15\}$, in two-dimensional space, is a perfect square.

The precision of a regular region $R=\langle k_1, k_2 \rangle$ with respect to the corresponding linear region, denoted "$P(k_1, k_2)$," is given by $$P(k_1,k_2)=S(\langle k_1,k_2 \rangle)/S([k_1,k_2])$$

In other words, the precision of a regular region with respect to its corresponding linear region is the ratio between the cardinalities of the regular region and the linear region. Clearly, the precision of a region is always a number between zero and one. It follows, from the definition, that, given two indices $k_1$ and $k_2$, where $k_1 \leq k_2$, when the regular region $\langle k_1, k_2 \rangle$ is perfect, then $P(k_1, k_2)=1$. Conversely, if $P(k_1, k_2)=1$, then $\langle k_1, k_2 \rangle$ is necessarily a perfect region.

Next, the notions of level and pattern of a region are introduced. Let $\langle k_1, k_2 \rangle$ be a d-dimensional region, where $B(k_1)=(b_{m-1}^1, \ldots, b_0^1)$ and $B(k_2)=(B_{m-1}^2, \ldots, b_0^2)$ are the binary forms of $k_1$ and $k_2$ respectively. Let $\otimes$ be the bit-wise XOR operation, $K=B(k_1) \otimes (k_2)=(b_{m-1}, \ldots, b_0)$, $b_i$ the non-zero most significant bit of K, and Floor (x) be the operation that takes a real number x and returns the greatest integer that is smaller than or equal to x. Then Floor(i/d)+1 is referred to as the level of the region $\langle k_1, k_2 \rangle$, written $Lvl(k_1, k_2, d)$. When $Lvl(k_1, k_2, d)=L$, the consecutive d bits $(k_{Ld-1}, \ldots, k_{(L-1)d})$ of K is referred to as the pattern of the region, written $Ptn(k_1, k_2, d)$.

The following two methods compute the level of any region and pattern of a region with size greater than 1 in d-dimensional space respectively. Note that the pattern of region is used for the purpose of region decomposition only. A region of size 1 (hence with level 0) will never be decomposed, and the pattern of such a region is undefined.

```
Method 3: Lvl(k_1,k_2,d)

if S([k_1,k_2]) = 1
   return 0
else
   let
      K = B(k_1) ⊗ B(k_2) = (b_{m-1},...,b_0)
      b_i the most significant non-zero bit in K
   in
      return Floor (i/d) + 1
end
```

Method 4: Ptn($k_1$,$k_2$,d)

let
    L = Lvl($k_1$,$k_2$,d)
    B($k_1$)⊗B($k_2$) = ($b_{m-1}$,...,$b_0$)
in
    return   ($b_{Ld-1}$,...,$b_{(L-1)d}$)

For example, Lvl(3, 15, 2)=2, Lvl(33, 57, 2)=3, Ptn(33, 57, 2)=(0, 1), Ptn(12, 39)=(1, 0).

The following two properties of a region $\langle k_1, k_2 \rangle$ always hold once the level for the region, Lvl($k_1$, $k_2$, d), is known:
(1) S($\langle k_1, k_2 \rangle$)=|$\langle k_1, k_2 \rangle$| is smaller or equal to $2^{L \cdot d}$.
(2) The region is either identical or a sub-region of a perfect cubic region of the same level. In the case of two-dimensional space, the region is either identical or a sub-region of a perfect square of the same level.

Region Decomposition

For a given region R=$\langle k_1, k_2 \rangle$, a list of regions ($R_1$, ..., $R_m$), where $R_i$=$\langle k_1^i, k_2^i \rangle$, is said to be an m-ary decomposition of R, denoted "($R_1$, ..., $R_m$) ∈ D(R)," if and only if
(1) Sub-Region: $R_i$ ⊂ R for i=1 to m
(2) Mutually Exclusive: $R_i$ ∩ $R_j$=ϕ, if and only if i≠j, for 1≧j≧m;
(3) Complete: $R_1$ ∪ $R_2$ ... ∪ $R_m$=R.

Furthermore, a decomposition of a region R is said to be monotonic when the indices within each sub-region in the list of sub-regions that comprises the decomposition are smaller than any of the indices within sub-regions to the right of the sub-region. For example, in two dimensional space, ($\rangle$3, 3$\rangle$, $\langle$6, 7$\rangle$,$\langle$9, 11$\langle$)12, 15$\langle$) ∈ D$\langle$3, 15$\rangle$ is 4-ary, and monotonic; ($\langle$48, 51$\rangle$, $\langle$56, 59$\rangle$) ∈ D$\langle$48, 59$\rangle$ is a binary and monotonic decomposition.

Note that sub-regions in a decomposition generally do not have the same precision as that of the region. For example, the region R=$\langle$48, 59$\rangle$, in the above example, has a precision of P($\langle$48, 59$\rangle$)=8/12=0.667. However the two sub-regions in the decomposition of R, as given in the above example, $\langle$48, 51 $\langle$ and $\rangle$56, 59$\rangle$, both have a precision of one. Generally speaking, the sub-regions resulting from decomposition of a region have higher precision than the decomposed region.

Methods for Region Decomposition

A region can generally be decomposed in many different ways. The methods for region decomposition presented here maximize the precision of the decomposed sub-regions. To achieve this, a region is decomposed according to the pattern of the region. The number of possible patterns for a d-dimensional space is given by $2^d-1$. Therefore, $2^d-1$ sub-programs are required in the currently described region decomposition method. In the following, the method for d=2 is given in detail, which can be generalized to work with higher dimensional spaces.

The following are two auxiliary methods to be used in the decomposition:

Method 5. LB(k, L) Lower bound of an index k for a given level L.

if L==0
    return k
else
    let B(k) = ($b_n$,...,$b_{2L}$,...,$b_0$) in
    return $B^{-1}$ ($b_n$,...,$b_{2L}$,0,...,0)
end where $B^{-1}$ is a function that takes a binary number as an argument and returns the corresponding integer.

Method 6. UB(k, L) Upper bound of an index for a given level L.

if L==0
    Return k
else
    let B(k) = ($b_n$,...,$b_{2L}$,...,b0) in
    return $B^{-1}$ ($b_n$,...,$b_{2L}$,1,...,1)
end In the following, the decomposition of a region $\langle k_1, k_2 \rangle$ into m sub-regions ($\langle k_1^{m-1}, k_s^{m-1} \langle, \ldots, \rangle k_1^0, k_2^0 \rangle$) by a specific decomposition function D, will be denoted by D($k_1$, $k_2$)= (($k_1^{m-1}, k_2^{m-1}$), ..., ($k_1^0, k_2^0$)).

Method 5. $D^1$($k_1$,$k_2$) for pattern = (0,1) in 2-dimensional space.

Let
    ($x_1^1$,$x_0^1$) = $F^{-1}$($k_1$)
    ($x_1^2$,$x_0^2$) = $F^{-1}$($k_2$)
    L = Lvl ($k_1$,$k_2$,2)
    $k_3$ = UB($k_1$,L − 1)
    ($x_1^3$,$x_0^3$) = $F^{-1}$($k_3$)
    $k_4$ = F($x_1^2$,$x_0^3$)
    $k_5$ = F($x_1^1$,$x_0^3$ + 1)
in
    return   (($k_1$,$k_4$),($k_5$,$k_2$))

Figure 4:
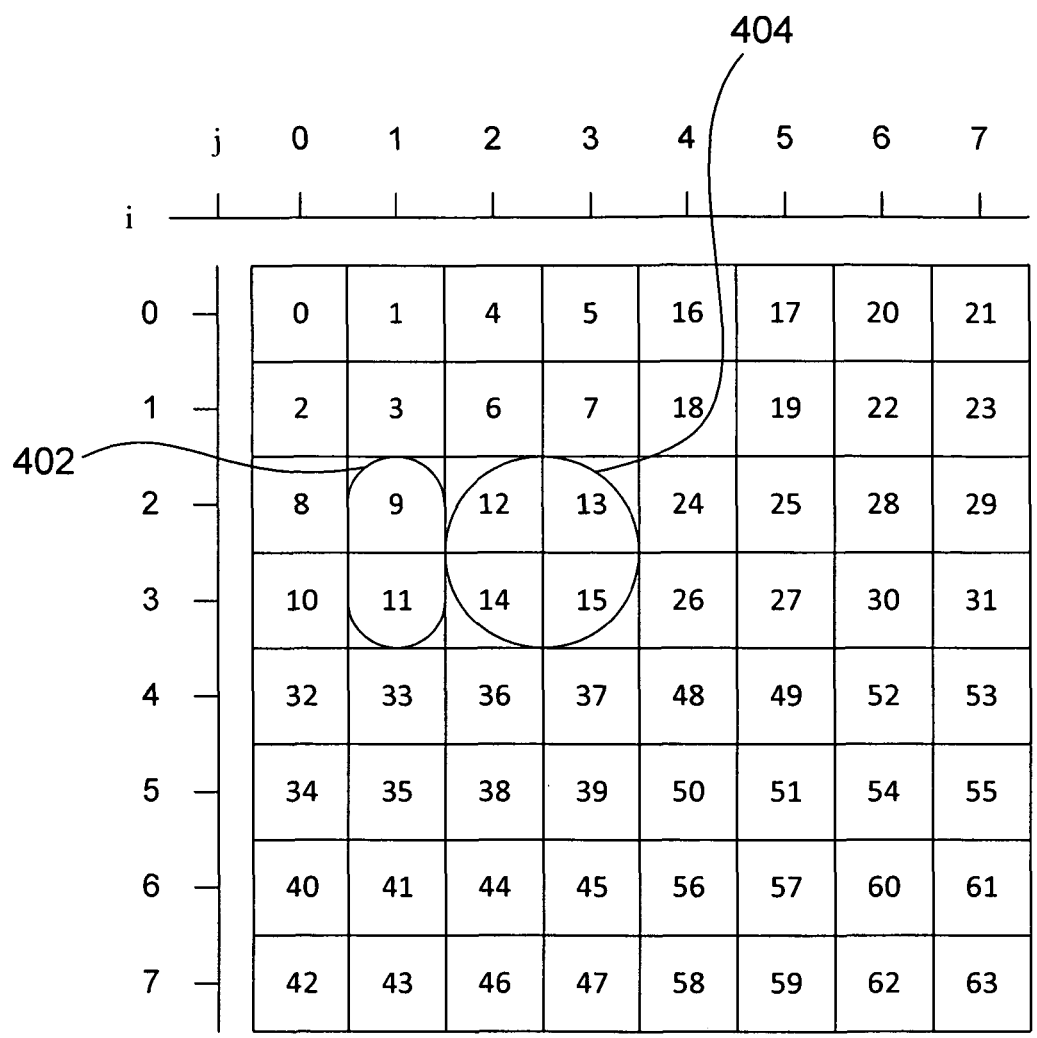
FIG. 4 illustrates how a 2-dimensional region with a pattern of (0, 1) is decomposed along a first dimension into two sub-regions, according to one embodiment of the present invention.

For example, the 2-dimensional region $\langle$ 9, 15 $\rangle$ has a pattern of (0, 1) and is decomposed by $D^1$ along the dimension of i into sub-regions $\langle$ 9, 11 $\langle$ and $\rangle$ 12, 15 $\rangle$. FIG. 4, which uses the same illustration conventions as FIG. 3, shows sub-regions $\langle$ 9, 11 $\rangle$ and $\langle$ 12, 15 $\rangle$ within curved boundaries 402 and 404.

Method 6. $D^2$($k_1$,$k_2$) for pattern = (1,0) in 2-dimensional space.

let
    ($x_1^1$,$x_0^1$) = $F^{-1}$($k_1$)
    ($x_1^2$,$x_0^2$) = $F^{-1}$($k_2$)
    L = Lvl ($k_1$,$k_2$,2)
    $k_3$ = LB($k_2$,L − 1)
    ($x_1^3$,$x_0^3$) = $F^{-1}$($k_3$)
    $k_4$ = F($x_1^3$ − 1,$x_0^2$)
    $k_5$ = F($x_1^3$,$x_0^1$)
in
    return   (($k_1$,$k_4$),($k_5$,$k_2$))

Figure 5:
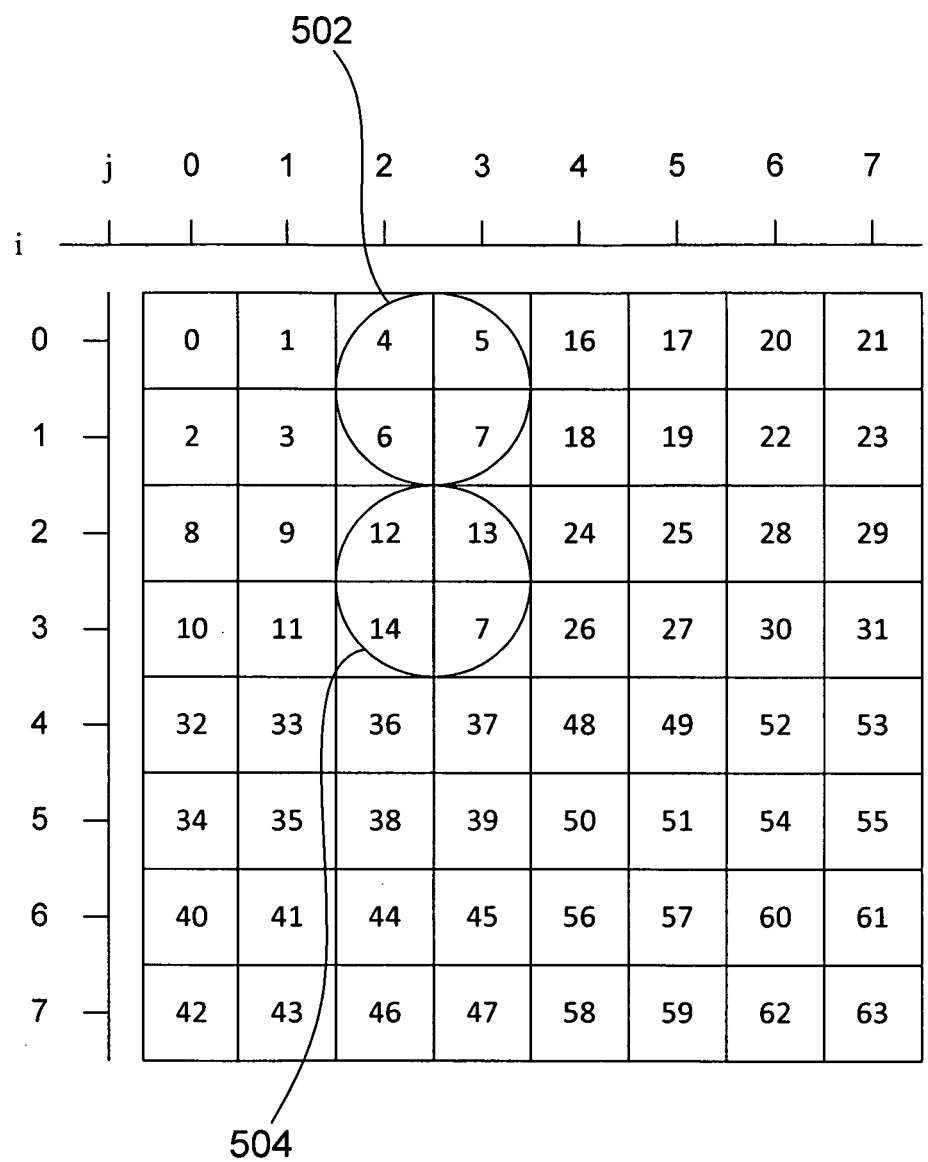
FIG. 5 illustrates how a 2-dimensional region with pattern (1, 0) is decomposed along a second dimension into two sub-regions, according to one embodiment of the present invention.

For example, the region $\langle$ 4, 15 $\rangle$ has a pattern of (1, 0), and will be decomposed by $D^2$ along the dimension of j into sub-regions of $\langle$ 4, 7 $\langle$ and $\rangle$ 12, 15 $\rangle$ FIG. 5, which uses the same illustration conventions as FIGS. 3 and 4, shows sub-regions $\langle$ 4, 7 $\rangle$ and $\langle$ 12, 15 $\rangle$ within curved boundaries 502 and 504.

Method 7. $D^3$($k_1$,$k_2$) for pattern = (1,1) in 2-dimensional space.

let
    ($x_1^1$,$x_0^1$) = $F^{-1}$($k_1$)
    ($x_1^2$,$x_0^2$) = $F^{-1}$($k_2$)
    L = Lvl ($k_1$,$k_2$,2)
    $m_3$ = UB($k_1$,L − 1)
    $m_4$ = F($x_1^1$,$x_0^3$ + 1)
    $m_5$ = F($x_1^3$,$x_0^2$)
    $m_6$ = F($x_1^3$ + 1,$x_0^1$)

-continued

Figure 6:
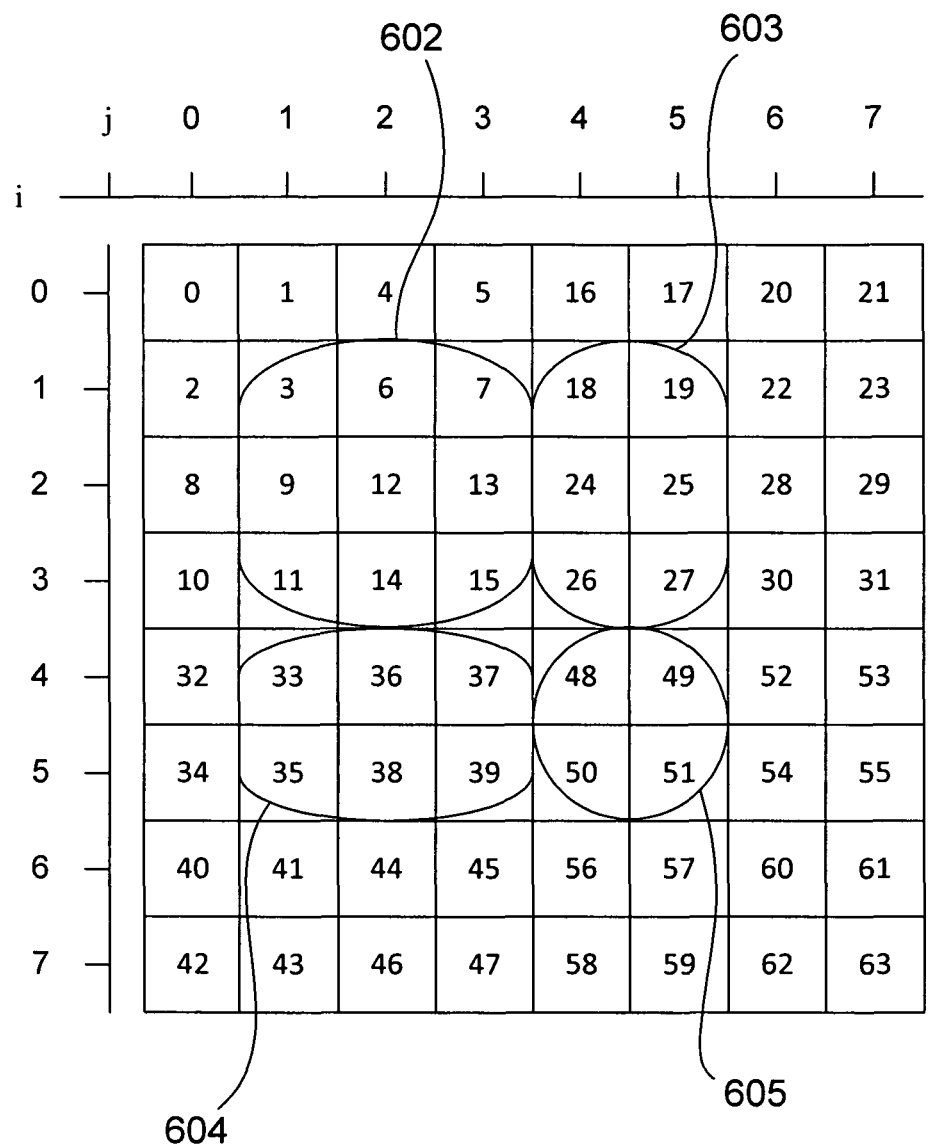
FIG. 6 illustrates how a 2-dimensional region with pattern (1, 1) is decomposed along both dimensions into four sub-regions, according to one embodiment of the present invention.

Method 7. $D^3(k_1,k_2)$ for pattern = (1,1) in 2-dimensional space.

$$m_7 = F(x_1^2, x_0^3)$$
$$m_8 = LB(k_2, L-1)$$
in
return $((k_1,m_3),(m_4,m_5),(m_6,m_7),(m_8,k_2))$ For example, the region ⟨3, 51⟩ has a pattern of (1, 1), and is decomposed by $D^3$ along both the dimensions of i and j into sub-regions ⟨3, 15⟨, ⟨18, 27⟩, ⟩33, 39⟩ and ⟨48, 51⟩. FIG. 6, which uses the same illustration conventions as FIGS. 3-5, shows sub-regions ⟨3, 15⟩, ⟨8, 27⟩, ⟨33, 39⟨ and ⟩48, 51⟩ within curved boundaries 602-605. Note that the three methods $D^1$, $D^2$, and $D^3$ for region decomposition always produce monotonic decompositions.

With the divisions for all the three possible patterns of a region in place, in a 2-dimensional space, the following is the region decomposition method.

Method 8. $D(k_1,k_2)$ decomposition of regions in 2-dimensional space if precision $(k_1,k_2) = 1$
  return $((k_1,k_2))$
else
  let pat = $Ptn(k_1,k_2,2)$ in
  case of pat
    $(0,1) : D^1(k_1,k_2);$
    $(1,0) : D^2(k_1,k_2);$
    $(1,1) : D^3(k_1,k_2);$
  end
end Furthermore, a region can be recursively divided, as shown in the following method:

Method 9. Div $(k_1,k_2, Acc, Ps)$, where Acc is the list of sub-regions initially set to the empty list [ ], Ps is a predicate over $k_1,k_2$ as the termination condition of the search, which can be used to control the precision of the search.

if Ps $(k_1,k_2)$
  Acc += $((k_1,k_2))$
else
  Decom = $D(k_1,k_2)$
  for each (s,t) in Decom
    Acc += Div(s,t,Acc,Ps)
  end
end
. return Acc The predicate Ps can be, for example, a function that calculates the precision of the region and determines whether it is above a given threshold, a function that examines the level of the region, and stops further decomposition when the level is below a given threshold, or some combination of both. Of course, one can also take the approach of setting the threshold precision to the value of 1 as the termination condition. In that case, the region will be decomposed into a set a perfect regions that collectively cover exactly the searched region.

Let Ps-x denote a predicate that returns TRUE if and only if the precision of a given region is above or equal to the threshold value of x. Then, the following are two examples of the recursive division.

Div(3,27,[ ],Ps–0.9)=[(3,3],(6,7),(9,9),(11,11),(12,15),
  (18,19),(24,27)]

Div(12,51,[ ],Ps–1)=[(12,15),(24,27),(36,39),(48,51))

Regional Search

Given points of interest in a d-dimensional space without any predictable pattern of the distribution, the problem of regional search is to find all the points of interest that fall within a given region. A database table is used to hold the records related to the points of interest (POIs). For the purpose of presentation, the table will be referred to as "the TPOI table." The system of this embodiment requires the augmentation of the table to include a column CKEY to hold the indices of the POIs, which are calculated with the bit-permutation mapping given in Method 1. Since the values in the column CKEY are integers, they can be indexed by the database system, and retrieved efficiently by the system.

A query of region search is made in the form of two corner points $x_1 = (x_{d-1}^1, \ldots, x_0^1)$ and $x_2 = (x_{d-1}^2, \ldots, x_0^2)$ of the d-dimensional space. The search is to retrieve each and every POI with coordinates $(x_{d-1}, \ldots, x_0)$ that satisfies the following condition:

$$\min(x_{k-1}^1, x_{k-1}^2) \leq x_{k-1} \leq \max(x_{k-1}^1, x_{k-1}^2), \ldots, \min(x_0^1, x_0^2) \leq x_0 \leq \max(x_0^1, x_0^2)$$

The following method is used for the region search:

Method 10. Region-Search $(x_1, x_2)$ $k_1 = F(x_1)$
$k_2 = F(x_2)$
if $k_1 > k_2$
  temp = $k_1$
  $k_1 = k_2$
  $k_2$ = temp
end
if precision $(k_1, k_2) = 1$
  sub-regions =[ $(k_1, k_2)$ ]
else
  sub-regions = $Div(k_1,k_2)$
end
POIS= [ ] #empty list
for each ( s, t ) in sub-regions
  POIS += Select * from TPOI where s ≤ CKEY ≤ t
end
return POIS Geographic Search The search of d-dimensional space has application in many different areas. Geographic search is one of them. In the following, it is assumed that the POIs are associated with latitudinal and longitudinal coordinates with a precision up to the m-th place after the decimal. A linear transformation is employed to transform a geographic point into a point in a two dimensional integer space. The following method gives the linear transformation.

Method 11. LT(lat, lng). Linear transformation of a geographic point given its latitude and longitude at the precision m.

$$i = (lat + 90) * 10^m$$

$$j = (lng + 180) * 10^m$$

$$\text{return}(i, j)$$

With this linear transformation, all points of interests can be assigned non-negative-integer coordinates in a two dimensional space. The search index of each POI can then be generated with the bit-permutation mapping F. For example:

lat=44.677198348794,lng=–122.120080823001,index=37459463583151357 lat=44.677911141839,lng=−122.405725461498,index=37458704662251054 lat=44.759668361174,lng=−122.058545902944,index=37459880683108980

The problem of geographic search is then reduced to the problem of a regional search in a two dimensional space. From the integer coordinates of points of interests, a column of indices is created by the calculation of the bit-permutation mapping. The column is indexed in the database for fast data retrieval. The following method performs geographic search given two corner points $p_1=(lat_1, lng_1)$ and $p_2(lat_2, lng_2)$, and returns all POI's in the TPOI table of the database that falls under the rectangular region with $p_1$, $p_2$ as the corner points.

---

Method 12. Geographic Search ($p_1,p_2$)

let
    $lat_1$ = Latitude($p_1$)
    $lng_1$ = Longitude ($p_1$)
    $lat_2$ = Latitude($p_2$)
    $lng_2$ = Longitude ($p_2$)
    $(i_1,j_1)$ = LT($lat_1,lng_1$)
    $(i_2,j_2)$ = LT($lat_2,lng_2$)
    $s_1 = (i_1,j_1)$
    $s_2 = (i_2,j_2)$
in
    Region-Search ($s_1,s_2$)

---

As an example, let $p_1=(47.123456, -122.120088)$, $p_2=(47.809030, -122.450068)$, then the rectangular region will be decomposed into the sub-regions of ([374687670548288800, 37468882373443583],
[37469020385476608, 37469138976698106],
[37470278310237440, 37470282532782079],
[37470286900172032, 37470291122716671],
[37470312669975808, 37470316892520447],
[37470321259910400, 37470394201931775],
[37470415749190912, 37470419971735551],
[37470424339125504, 37470428561670143],
[37470450108929280, 37470454163035517],
[37470462921408512, 37470522882512253],
[37470531640885248, 37470779485766776])

which is then converted to database query based on the CKEY column values to retrieve all the POIs that falls within the queried region in the database.

Performance, Pragmatics, and Variants

Figure 7:
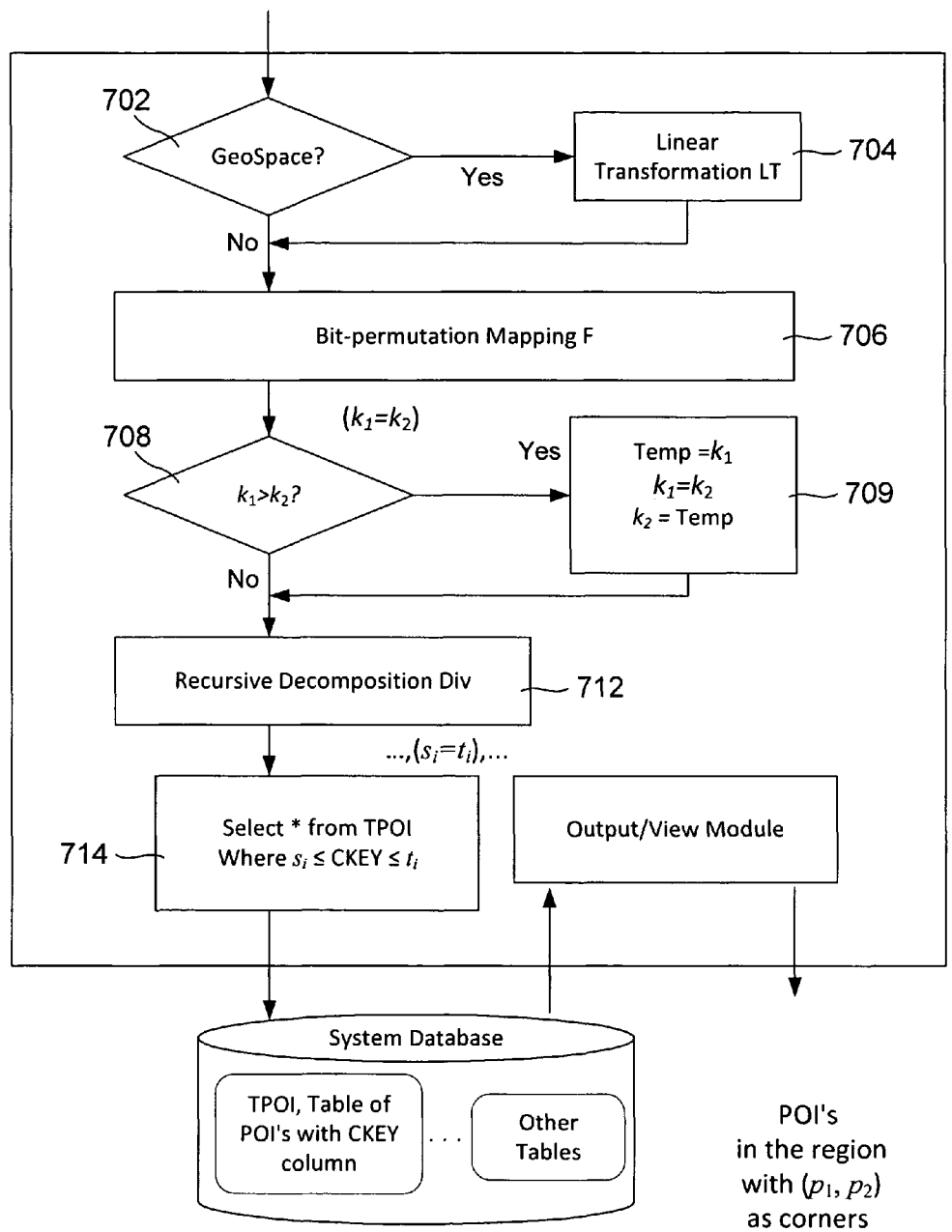
FIG. 7 is a diagram of a system that represents one embodiment of the present invention and that supports multi-dimensional/geographic search.

FIG. 7 provides a diagram for a multi-dimensional/geographic-search system that utilizes components including mappings, linear transformations, and region decomposition and that represents one embodiment of the present invention. In FIG. 7, in step 702, the system determines whether a geographical search is to be undertaken. If so, then, in step 704, a linear transformation is undertaken to transform the real-valued longitudinal and latitudinal coordinates of two corner points that define a region to two-dimensional integer-valued coordinates. In step 706, a bit-permutation function F is applied to the integer-valued coordinates to generate one-dimensional indices. In steps 708-709, the pair of indices that define a region are placed in ascending order. In step 712, a recursive decomposition of the region, by above-described methods, is carried out to produce a list of sub-regions. In step 714, database commands are generated, based on the list of sub-regions, to retrieve POIs from the database.

The database may be a relational database managed by a relational-database-management system or other type of database that stores POI information on one or more mass-storage devices. Database management systems are generally software-implemented systems that execute on one or more computers. The multi-dimensional/geographic-search system may be a stand-alone software-implemented system, or may be incorporated, as a component, into other systems.

Given a region in a space, suppose U is the set of POIs that fall within the region, and V is the set of POIs actually returned by a searching system, then the precision and recall of the search are defined as follows:

$$\text{Precision} = \frac{|U \cap V|}{|V|}$$

$$\text{Recall} = \frac{|U \cap V|}{|U|}$$

The system that represents one embodiment of the present invention reduces a search of a regular region to the search of a set of sub-regions, which always collectively covers the regular region. The process can be thought as approximating a regular region with a set of linear regions. The precision of the approximation, and hence the precision of the search, is improved with each decomposition, while the recall of the search is always kept at one. The precision of the search by the system can be controlled and adjusted, by the predicate Ps of Method 9, thus allowing a trade-off between the precision and search time. When so desired, the precision can be set to the value of one.

According to embodiments of the present invention, computation of one search index of one POI is independent from computation of that of other POIs. Therefore, the contents of the CKEY column can be generated in large batches, as, for example, during initial incorporation of a large number of POIs obtained from a third-party data source, or in smaller batches or individually, as, for example, during incremental system data updates. The time taken per POI is constant, regardless of batch size. Similarly, deletions of POIs from the table are constant-time-per-POI operations.

The search method of various embodiments of the present invention does not rely on a tree-like data structure, relied on by many other searching methods. As a result, embodiments of the present invention are characterized by efficient use of storage space, simplicity, and search efficiency. Embodiments of the present invention do not traverse a tree-like data structure from top to bottom, one level at a time, as do many other searching methods. In many situations, regions can be decomposed in a number of steps logarithmically proportional to the size of the region, as opposed to the size of the search space. As an example, the region ⟨15, 48⟩ in the two-dimensional space can be completely decomposed in one step regardless the number of levels that actually exists in the space.

In the above presentation of Region-Search, the query to the database is not made until the list of sub-regions is completely generated. A variant scheme is to query the database as soon as a sub-region meets the standard imposed by the predicate Ps. The Region-Search can then continue while the database search is done in parallel, and possibly on a different server, and therefore further minimize the system response time. Parallelism in the search system of this embodiment can be further exploited by the observation that the queries to the database based on the sub-regions never overlap and can be done independently of each other.

There are times when it is desired to search for the POI's within a certain radius of a given center point, which is a search over a circularly-shaped region. The problem can be reduced to search of a square region inscribed by the circle. The calculation of the coordinates of the two corners of the square is a simple geometrical exercise. By the ratio of the areas of the circular-shaped region and square region, respectively, the precision of the search will be around 0.79 provided the distribution of the POI is uniform. When a precision of 1 is desired, the result can be easily filtered by a calculation of distance from the given center for each POI in the result produced by the region search based on the square. Similarly, embodiments of the present invention can be used to search regions with shapes other than rectangular or square regions by approximating the area with a set of rectangles. The irregular regions in space with dimensionality higher than two can be likewise approximated by a series of regular cubes before the region search based on regular shapes is applied.

Web-based or Mobile-based electronic map engine generally cut the map of a large space into tiles with different levels. When the map is shifted along different directions or zoomed in and out between different levels, the map needs to be updated with new tiles. In other words, when the map is moved or zoomed, an engine that powers the maps need to search for the tiles that fall within the view window, which is generally rectangular. Although map tiles are conceptually different from points of interest because, unlike a point, a tile takes up an area of space, embodiments of this invention can be used in an engine that powers the map. This is because a tile, usually shaped as a rectangle, can be represented by its four corner points, and a tile is then retrieved to update the changed map if and only if at least one of its corner points are located under the viewing region of the changed map. The embodiments of the present invention therefore can be used to power both the engine that drives an electronic map and the search engine for points of interests.

The invention claimed is:

1. A multi-dimensional and geographic-search system comprising:
    a search-region-receiving component that receives a number i of sets of coordinates that define a region to be searched, the number i greater than 1 and each of the i sets of coordinates including d coordinates associated with a multidimensional space, each of the d coordinates represented by an ordered sequence of n bits;
    an indexing component that generates, by a bit-permutation mapping, i integer indexes that include an integer index for each of the i sets of the received coordinates, the bit-permutation mapping grouping, for each of the n bits used to represent each of the d coordinates of a set of coordinates, the bits of the d coordinates at each bit position within the ordered-bit-sequence representations of the d coordinates together into a subsequence of bits within an ordered sequence of subsequences of bits that together compose the integer index;
    a recursive-decomposition component that decomposes the region into sub-regions based on the integer indices generated by the indexing component; and
    a search component that selects points of interest from a points-of-interest database by comparing integer indices computed for the regular sub-regions to indices computed and stored in the database for each point of interest.

2. The multi-dimensional and geographic-search system of claim 1 wherein the search-region-receiving component receives real-valued longitudinal and latitudinal coordinates for two points that define a geographical region.

3. The multi-dimensional and geographic-search system of claim 2 wherein the real-valued longitudinal and latitudinal coordinates for two points that define a geographical region are coordinates for two, diagonally opposed corners of a rectangular region.

4. The multi-dimensional and geographic-search system of claim 1 wherein the search-region-receiving component receives real-valued coordinates for two points that define a volume in a space of three or more dimensions.

5. The multi-dimensional and geographic-search system of claim 1 wherein the recursive-decomposition component decomposes the region into regular sub-regions based on the integer indices generated by the indexing component by:
    when a termination condition is not satisfied,
        decomposing the region according to a pattern computed for the region to generate two or more lower-level regular sub-regions; and
        recursively decomposing the two or more regular sub-regions.

6. The multi-dimensional and geographic-search system of claim 5 wherein a region or regular sub-region is decomposed into lower-level regular sub-regions by:
    computing a pattern for the region or regular sub-region;
    using the computed pattern to select a decomposition method; and
    applying the selected decomposition method to the region or regular sub-region.

7. The multi-dimensional and geographic-search system of claim 6 wherein a decomposition method, when applied to a region or regular sub-region:
    identifies corner points for two or more regular sub-regions of the region or regular sub-region; and
    computes one-dimensional integer indices, based on the identified corner points, for the two or more regular sub-regions of the region or regular sub-region.

8. The multi-dimensional and geographic-search system of claim 7 wherein the decomposition method decomposes a region or regular sub-region in such a way that the precisions of the regular sub-regions produced by the decomposition method are maximized.

9. A mapping system comprising:
    a tile-specifying component that receives a number i of sets of coordinates that define region, the number i greater than 1 and each of the i sets of coordinates including d coordinates associated with a multidimensional space, each of the d coordinates represented by an ordered sequence of n bits;
    an indexing component that generates, by a bit-permutation mapping, i integer indexes that include an integer index for each i sets of the coordinate that defines the region, the bit-permutation mapping grouping, for each of the n bits used to represent each of the d coordinates of a set of coordinates, the bits of the d coordinates at each bit position within the ordered-bit-sequence representations of the d coordinates together into a subsequence of bits within an ordered sequence of subsequences of bits that together compose the integer index;
    a recursive-decomposition component that decomposes the region into regular sub-regions based on the integer indices generated by the indexing component; and
    a tile-retrieving component that retrieves tiles corresponding to the regular sub-regions computed by the recursive-decomposition component.

10. The mapping system of claim 9 wherein the tile-specifying component receives real-valued longitudinal and latitudinal coordinates for two points that define the region.

11. The mapping system of claim 10 wherein the real-valued longitudinal and latitudinal coordinates for two points that define the region are coordinates for two, diagonally opposed corners of a rectangular region.

12. The mapping system of claim 9 wherein the recursive-decomposition component decomposes the region into regular sub-regions based on the integer indices generated by the indexing component by:
   when a termination condition is not satisfied,
      decomposing the region according to a pattern computed for the region to generate two or more lower-level regular sub-regions; and
      recursively decomposing the two or more regular sub-regions.

13. The mapping system of claim 12 wherein a region or regular sub-region is decomposed into lower-level regular sub-regions by:
   computing a pattern for the region or regular sub-region;
   using the computed pattern to select a decomposition method; and
   applying the selected decomposition method to the region or regular sub-region.

14. The mapping system of claim 13 wherein a decomposition method, when applied to a region or regular sub-region:
   identifies corner points for two or more regular sub-regions of the region or regular sub-region; and
   computes one-dimensional integer indices, based on the identified corner points, for the two or more regular sub-regions of the region or regular sub-region.

15. The mapping system of claim 14 wherein the decomposition method decomposes a region or regular sub-region in a such a way that the precisions of the regular sub-regions produced by the decomposition method are maximized.

\* \* \* \* \*